US009769034B2

United States Patent
Ravindran et al.

(10) Patent No.: US 9,769,034 B2
(45) Date of Patent: Sep. 19, 2017

(54) METHOD AND APPARATUS FOR POLICY BASED ROUTING IN INFORMATION CENTRIC NETWORKING BASED HOME NETWORKS

(71) Applicant: Futurewei Technologies, Inc., Plano, TX (US)

(72) Inventors: Ravishankar Ravindran, San Jose, CA (US); Guo-Qiang Wang, Santa Clara, CA (US); Xinwen Zhang, San Ramon, CA (US); Asit Chakraborti, Pleasanton, CA (US); Trisha Biswas, Raleigh, NC (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/732,072

(22) Filed: Dec. 31, 2012

(65) Prior Publication Data

US 2014/0173076 A1 Jun. 19, 2014

Related U.S. Application Data

(60) Provisional application No. 61/737,608, filed on Dec. 14, 2012.

(51) Int. Cl.
*G06F 15/16* (2006.01)
*H04L 12/24* (2006.01)
(Continued)

(52) U.S. Cl.
CPC ...... *H04L 41/5058* (2013.01); *H04L 12/6418* (2013.01); *H04L 45/306* (2013.01); *H04L 67/327* (2013.01)

(58) Field of Classification Search
CPC ............... H04L 41/5058; H04L 67/327; H04L 12/6418; H04L 45/306
(Continued)

(56) References Cited

U.S. PATENT DOCUMENTS 5,509,123 A 4/1996 Dobbins et al.
6,442,164 B1 8/2002 Wu
(Continued)

OTHER PUBLICATIONS

Zhang, X., U.S. Appl. No. 13/658,299; Title: "Name-Based Neighbor Discovery and Multi-Hop Service Discovery in Information-Centric Networks," filed Oct. 23, 2012; Specification 44 pages; 16 Drawing Sheets (Figs. 1-35).

*Primary Examiner* — Bryan Lee
*Assistant Examiner* — Oluwatosin Gidado
(74) *Attorney, Agent, or Firm* — Conley Rose, P.C.

(57) ABSTRACT

A network node, comprising a receiver configured to receive a request for a service, wherein the request comprises a hierarchically structured name comprising a root and a suffix, a data storage component comprising a network synchronized policy rule associated with a service name root, wherein the network synchronized policy rule is applied to any request for a service whose name comprises a root matching the service name root, and a processor coupled to the receiver and to the data storage component, wherein the processor is configured to apply the network synchronized policy rule to the request, wherein the processor is configured to synchronize service definitions and service policies with other nodes in a network based on the name of the service, and wherein the network synchronized policy rule is synchronized with the other nodes in the network using name-based routing.

20 Claims, 11 Drawing Sheets

(51) Int. Cl.
*H04L 29/08* (2006.01)
*H04L 12/64* (2006.01)
*H04L 12/725* (2013.01)

(58) Field of Classification Search
USPC .................................................. 709/238, 223
See application file for complete search history.

(56) References Cited

U.S. PATENT DOCUMENTS

| | | |
|---|---|---|
| 6,449,647 B1 | 9/2002 | Colby et al. |
| 6,606,663 B1* | 8/2003 | Liao ........................ G06Q 20/20 |
| | | 705/25 |
| 6,965,968 B1* | 11/2005 | Touboul ........................ 711/118 |
| 7,213,077 B2 | 5/2007 | Border |
| 7,599,289 B2 | 10/2009 | Caci |
| 2002/0029256 A1* | 3/2002 | Zintel et al. ................... 709/218 |
| 2003/0114148 A1* | 6/2003 | Albertsson .............. H04W 4/00 |
| | | 455/414.1 |
| 2008/0098453 A1* | 4/2008 | Hinton et al. ..................... 726/1 |
| 2008/0261593 A1* | 10/2008 | Wong .................. H04W 72/048 |
| | | 455/435.1 |
| 2013/0080874 A1* | 3/2013 | Coleman ........... G06F 17/30893 |
| | | 715/234 |
| 2013/0239193 A1* | 9/2013 | Bouchard et al. ................. 726/7 |
| 2014/0122791 A1* | 5/2014 | Fingerhut et al. ............ 711/108 |

* cited by examiner

| Service Name | Groups/users | Action-flag | Policy functions | Next hop |
|---|---|---|---|---|
| /entertainment/media-center/video | Private | 0x11 | <check-security> | f1,f2 |
| | AliceFriends | 0x12 | <...> | |
| /climate/thermo-stat-1/ | Public | 0x11 | <check-security> | f1 |

*FIG. 6*

METHOD AND APPARATUS FOR POLICY BASED ROUTING IN INFORMATION CENTRIC NETWORKING BASED HOME NETWORKS

CROSS-REFERENCE TO RELATED APPLICATIONS

The present application claims the benefit of U.S. Provisional Patent Application No. 61/737,608 filed Dec. 14, 2012 by Ravishankar Ravindran, et al. and entitled "Method and Apparatus for Policy Based Routing in Information Centric Networking Based Home Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A home network is a residential local area network (LAN) for communication between devices typically deployed in the home. The devices may typically include routers, gateways, personal computers, laptops, tablet computers, printers, mobile devices (e.g., mobile phones), appliances (e.g., refrigerators, heating, ventilation, and air conditioning systems), and/or entertainment systems (e.g., televisions, home theaters, stereos, etc.), and/or low power networks comprising of sensors and actuators. The devices may share Internet access and content. The network may include both wireless (e.g., a WiFi) and wired (e.g., Ethernet) connectivity.

SUMMARY

In one embodiment, the disclosure includes a network node, comprising a receiver configured to receive a request for a service, wherein the request comprises a hierarchically structured name comprising a root and a suffix, a data storage component comprising a network synchronized policy rule associated with a service name root, wherein the network synchronized policy rule is applied to any request for a service whose name comprises a root matching the service name root, a processor coupled to the receiver and to the data storage component, wherein the processor is configured to apply the network synchronized policy rule to the request, wherein the processor is configured to synchronize service definitions and service policies with other nodes in a network based on the name of the service, and wherein the network synchronized policy rule is synchronized with the other nodes in the network using name-based routing, and a transmitter coupled to the processor and configured to forward the request to a next network node when instructed by the processor.

In another embodiment, the disclosure includes a method in an information centric networking (ICN) network node for discovering a service, comprising synchronizing at a processor service definitions and service policies with other nodes in the ICN, wherein synchronizing comprises applying name-based networking principles, and wherein the service policy rules are synchronized with the other nodes in the network using name-based routing; receiving at a receiver a service interest from a network device, wherein the service interest comprises a hierarchically structured name comprising a root and a suffix; applying with the processor an ICN synchronized policy rule associated with a service root to the service interest based on root matching the service root; and instructing at the processor a transmitter to forward the interest to a next network node when the processor determines that the service interest passes the ICN synchronized policy.

In another embodiment, the disclosure includes, in an information centric networking (ICN) network node in an ICN based network, a computer program product executable by a processor, the computer program product comprising computer executable instructions stored on a non-transitory computer readable medium that when executed by the processor cause the ICN network node to perform the following: synchronize service definitions and service policies with other nodes in the ICN, wherein synchronizing comprises applying name-based networking principles, and wherein the service policy rules are synchronized with the other nodes in the network using name-based routing; receive a service interest from a network device, wherein the service interest comprises a hierarchically structured name comprising a root and a suffix; apply an ICN synchronized policy rule associated with a service root to the service interest based on root matching the service root; and instruct a transmitter to forward the interest to a next network node when the processor determines that the service interest passes the ICN synchronized policy.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a diagram illustrating an example of a policy based forwarding information base (FIB) according to a disclosed embodiment.

DETAILED DESCRIPTION

Figure 1:
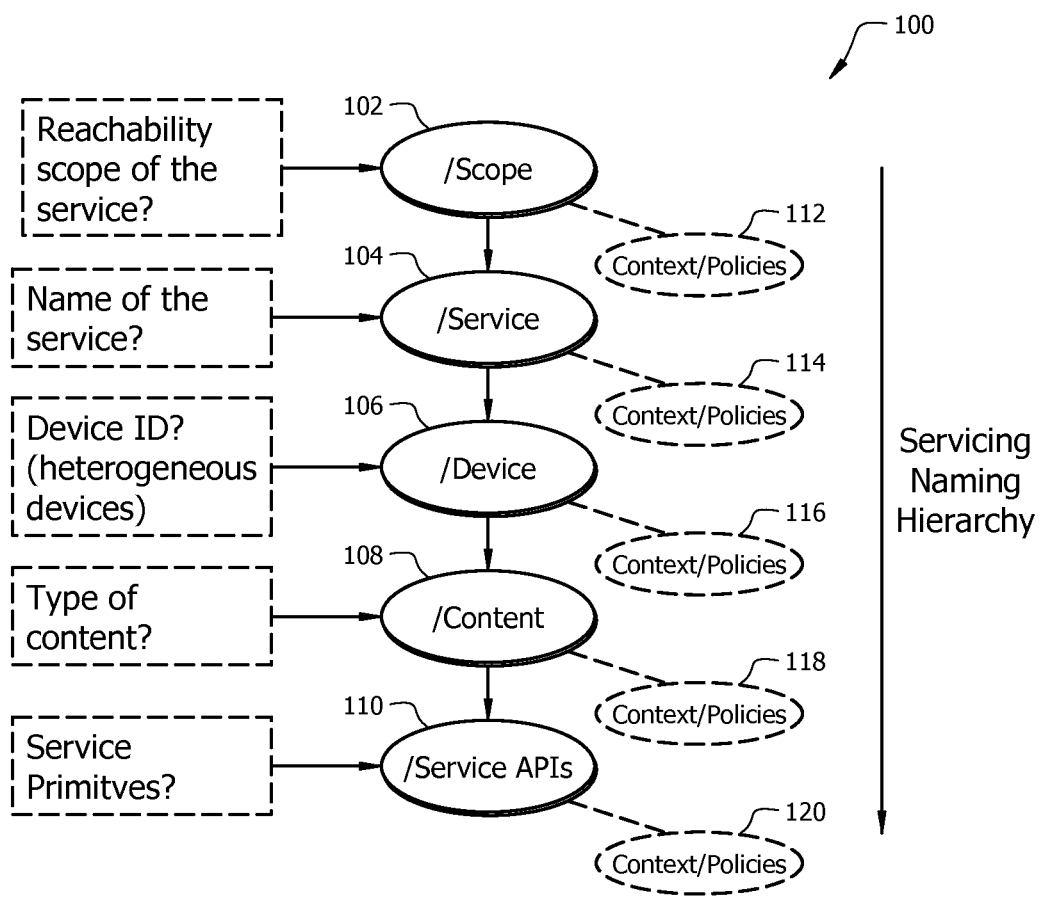
FIG. 1 is a schematic diagram of a hierarchical generalized service-centric naming scheme for home networks according to a disclosed embodiment.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Home Networking is becoming more complex with the inclusion of an ever increasing number of devices and sensors used to manage and monitor in-home systems, such as entertainment, climate, lighting, and home security. As the home environment produces more and more information, such as user-generated content, home surveillance system information, and information from sensor-enabled appliances, the home network may become more user-empowered in terms of the manner in which the information is accessed. Further, since the exit of the home traffic to the Internet is through a service provider and since the service provider may have the ability to have at least one provider managed device in the home premises, service providers may have an opportunity to provide many services, such as remote home security monitoring, remote assistance, home social network for content sharing, and machine-to-machine applications. Some of these services may be provided in collaboration with third parties.

From a home network planning perspective, the home network devices should be managed at all levels, such as device level, basic addressing/naming issues (which should be as minimal as possible), transport layer properties related to Open Systems Interconnection (OSI) Layer 2/Layer 1 (L2/L1) connectivity to the home network (which may be predominantly wireless), network layer connectivity, service publishing/subscription, and security. From a network level perspective, current standards efforts (e.g., HomeNet working group) extend Internet Protocol version 6 (IPv6) to name, route, secure, and inter-connect the home network devices among themselves and to the Internet. However, the IPv6 approach carries forward some of the IP version 4 (IPv4) drawbacks into home networking. Some of these drawbacks may include: (1) a layer of mapping from names to IPv6 locators, which may incur one more levels of configuration; (2) non-intuitive networking where the objective is to connect hosts rather than aggregate and disseminate information among user/devices/services, considering that more than one device may be offering the same service; (3) security that may operate as an overlay, rendering the content useless once the secure channel ceases to exist; (4) preventing devices from leveraging their multi-homing capability to achieve better throughput and quality of experience (QoE); and/or (5) a lack of features to reuse requested content or multicast content by leveraging caching in the network elements. This disclosure addresses these challenges by applying principles of information-centric networking to home networks (Homenets). Disclosed is a generic naming and policy based routing approach to control and manage services and exchange information among authorized devices when in the home domain or in the Internet. The disclosed policy based routing may utilize named-based routing principals such as those utilized in ICN and Named Data Networking (NDN) in which routing is based on the name of the object rather than an IP address.

ICN may provide information dissemination by routing on names that identify content objects and services, rather than by location. This allows one to disassociate services and resulting content objects from their location. An ICN may include a FIB, and a content store (CS). An ICN network may work on two primitives: interest and data. An ICN-enabled device may look for the closest copy of content by multicasting the interest packets with the content name into the network. Contents may reside in any host at the producers end, or may be cached in CS s of the ICN-routers. This caching feature may allow users to retrieve the same content without introducing replicated traffic into the network. As long as some users have retrieved the content, the content may be cached in the network and may be fetched by any number of users.

Networking via naming may provide advantage in terms of location independence of content originally generated by a service resident on a server or an end device. As in the case of the Internet, this naming scheme may have applicability in home environments, too, where devices may be nomadic or mobile and many devices providing the same services may be dispersed in several locations both in and out of the home domain.

Disclosed herein are a naming scheme, method, system, and apparatus that take advantage of the naming flexibility ICN provides to inter-network around services rather than around the connectivity or reachability of devices and the devices' constraints that may be due to physical layer connectivity. The disclosed system may enable rich policy-based routing, allowing home users to realize their objectives of content accessibility across the home domain, and also outside the home boundary through the Internet. With global routable names, these services within the home network may also be accessible from outside the home. The accessibility of the services within the home network from outside the home may be controlled by the provider managing the home services. The disclosure may enable a service/context aware transport plane, which may adapt to changes to service reachability, actively monitor interest traffic from users, apply service policies such as filtering, access control, and attribute manipulation, so that policies of the home operator may be strictly enforced in real time, thereby relieving the service producing nodes from the task of applying policy rules for every incoming interest. Service policies may be any policy that may be enforced are executed prior to or during the execution of a service or service request. Policy rules or service policy rules may be a rule executed in order to implement a policy. The terms "policy" and "policy rule" may be used interchangeably in this disclosure.

FIG. 1 is a schematic diagram of a hierarchical generalized service-centric naming scheme 100 for home networks according to a disclosed embodiment. Scheme 100 may comprise a service naming hierarchy. The hierarchy may comprise a scope component 102, a service component 104, a device component 106, a content component 108, and service application programming interfaces (APIs) component which may include the service call and associated attributes 110. Each of the components 102, 104, 106, 108, 110 of the service naming hierarchy may comprise context/policies 112, 114, 116, 118, 120. Scope component 102 may identify the reachability scope of the service. Service component 104 may identify the name of the service. Device component 106 may be a device identifier (ID) and may distinguish between heterogeneous devices. Content component 108 may identify the type of content. Service APIs component 110 may identify the service primitives for a desired service. The context/policies 112, 114, 116, 118, 120 may define various policies that should be applied before retrieving the desired service or content. Depending on the application, the naming hierarchy may be customized to a particular application, for example, in case of a sensor network, the level dealing with device ID may be skipped as the objective here may be to extract the latest measurements from the sensors. A name of a service composed according to the scheme 100 may comprise a root and a suffix where the root comprises a first portion of the name and the suffix comprises a second portion of the name. For example, in one context, the root of a name composed according to the scheme 100 may comprise components 102 and 104 while the suffix may comprise components 106, 108, and 110. In another context, the root of the same name may be composed of components 102, 104, 106, and 108 while the suffix may comprise component 110. The context may depend on at what level a policy is associated with a service name. The policy may be associated with and applied to all service names having a common root where the root may comprise one or more of the first (or highest level components) and the suffix comprises the remaining (or lower level components) of the hierarchically structured name.

Figure 2:
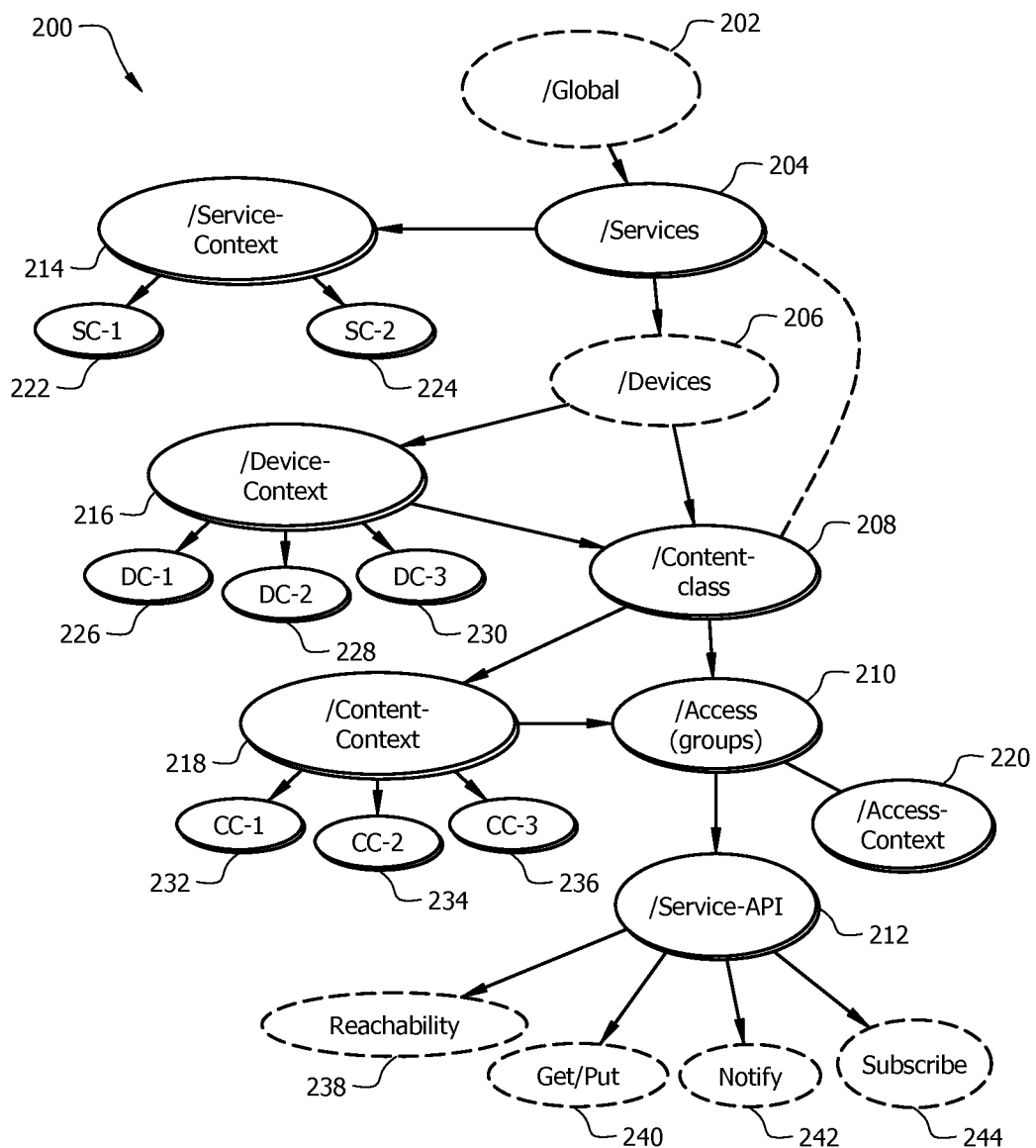
FIG. 2 is a schematic diagram of another hierarchical generalized service-centric naming scheme for home networks according to a disclosed embodiment.

FIG. 2 is a schematic diagram of another hierarchical generalized service-centric naming scheme 200 for home networks according to a disclosed embodiment. Scheme 200 may be similar to scheme 100. Scheme 200 may comprise a global component 202, a service component 204, a device component 206, a content-class component 208, an access component 210, and a service-API component 212. Global component 202 may be similar to scope component 102, service component 204 may be similar to service component 104, device component 206 may be similar to device component 106, content-class component 208 may be similar to content component 108, and service-API component 212 may be similar to service APIs component 110. Similar to scheme 100, a name according to scheme 200 may comprise a root and a suffix where the root comprises a specified first levels of the hierarchically structured name and the suffix comprises the remaining lower levels of the hierarchically structured name. The components composing the root and the suffix may change for the same name depending on context and the policy to be applied.

The naming schemes 100 and 200 may be from the point-of-view of a home user or operator, who may expect intuitive and simplified provisioning and configuration of service categories and of the devices providing the services. Provisioning a device may mean changing or evolving a device to a state in which it may be used by an end user. The naming schemes 100 and 200 may be generic enough to make it extendable for any future service/device instance. The naming schemes 100 and 200 may be implemented and provisioned through a centralized interface, such as the home gateway.

For naming scheme 200, at the highest level is the global component 202, which is a provider assigned component that is applied with a service that may require global reachability. Next is the service component 204 which may identify the services or the classes of service. The services or classes of services may include any of the well-known application/service classes, such as entertainment, climate control, security, etc., or any other services or classes of services. More than one host may provide the same service, e.g., many temperature sensors spread across multiple rooms could be addressed under the same service-id category by the service component 204. These may be enabled by sub-service contexts layer 214 identified by SC-x, such as SC-1 222 and SC-2 224. In the next level (i.e., the device component 206), the hosts (e.g., devices) may be identified. Although ICN may not promote host level identification, this may be necessary in some embodiments in order to manage the hosts providing the service. However, in cases where the service properties and functioning are required to be homogenous across all the devices, this device level hierarchy 206 may not be necessary. In addition, the device component 206 also may allow for conduct subscription and publishing with device granularity. Thus, the device component 206 may comprise a device-context sub-component 216 and the device granularity may be identified by DC-1 226, DC-2 228, and DC-3 230. The next level (i.e., content-class component 208) may provide the type of content service in order to manage the case where the same device may provide different content types. The next level (i.e., access component 210) may define the access privileges that allow the home operator to assign home entities (users/devices) to different virtual groups with the objective that members of a given virtual group may have access to a particular service determined by certain policy restrictions. At another sub-level, action access-contexts components 220, such as action-flags, may be defined. The action-flags may be required to be presented by the consumers to the network. The action-flags may allow appropriate processing of these interests as desired by the service producers. The next level may be the service API component 212 which may define the service APIs (e.g., Get/Put 240, Subscribe 244, Notify 242, etc.) which may be allowed within this service context. The service API component 212 may also define meta-attributes related to its reachability 238 of being either locally or globally accessible.

The names may be generated automatically based on a naming hierarchy set provided by the provider and/or from device's unique ID, and/or input from the user. In a home scenario, the home gateway may be a single point where data may be input. The user interaction may typically most often be required during a device activation phase, where the user may create a name for the device and/or services provided by the device.

Figure 3:
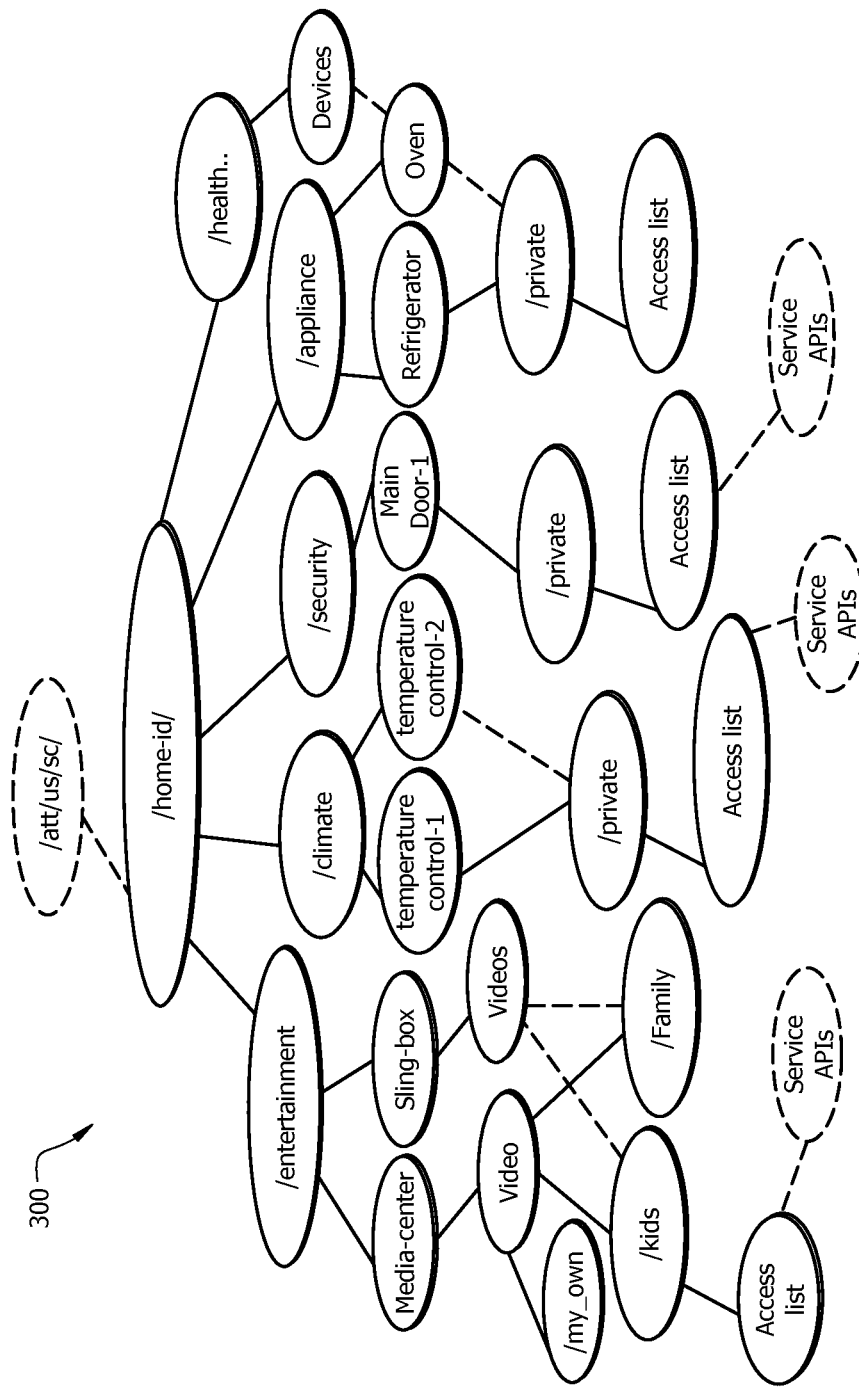
FIG. 3 is a schematic diagram illustrating a generalized naming scheme applied to a particular home scenario according to a disclosed embodiment.

FIG. 3 is a schematic diagram illustrating a generalized naming scheme 300 applied to a particular home scenario according to a disclosed embodiment. Naming scheme 300 may be an application of naming scheme 100 or 200. Here, the home being equipped with different services, such as entertainment, climate, security, appliance control, health etc., is shown. Each of the services may be produced and consumed locally or may be provided and managed by a service provider solely or in collaboration with a third party.

Following are two examples following the disclosed naming hierarchy. In the first example, several media-centers at a home may provide an entertainment service comprising videos, with service access defined for individuals or virtual groups, each of which may have service and security policies associated with them. The security requirement may be published and discovered as part of the service publish/discovery process. This scenario may be mapped to the disclosed naming structure as follows: Global Scope:{/att/sc}; Service Class: {/entertainment }; Devices:{/media-center-1, /media-center-2}; Content Class: {/Videos }; Groups {/Alice-personal, /Family}; Access List: {{/Alice, {Action Flags}}, {All, {Action Flags }}.}; Security_policy{Action Flags }; Service_Api {Get}. Hence to access the video service by a consumer, Alice, within the home domain, the interest may be /home-id/entertainment/ media-center-1/Video/service/Alice/ /{Security-Credentials }/Get. Further, the device may be avoided in the interest, if the service level multicast is required. In this case, the interest may be applied to the service policies announced by all the service producing nodes under the service category.

In the second example, a climate-control service may be provided that may be accessed and controlled by only a few members of the home. This service may be mapped to the disclosed naming structure as follows: Service Class {climate-control}; Device: {thermostat-1}; Groups: {private}; Access-list: {Bob, Alice, {Action flags}}; Service_Api{Get, Notify, Subscribe}. Hence to access the climate control service by a user, Bob, in the home domain, the interest may be /climate-control/thermostat/service/private/Bob/{Security-Credentials }/Get.

Figure 4:
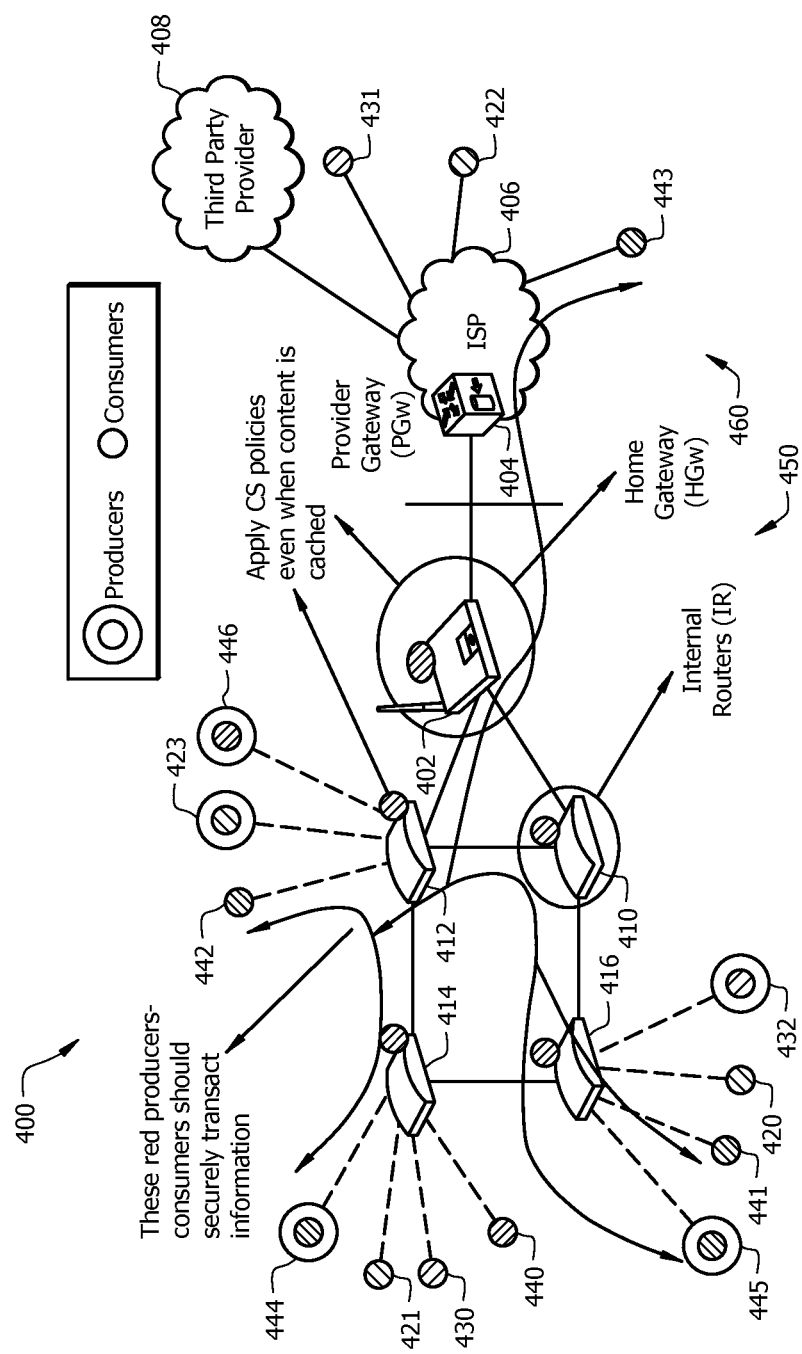
FIG. 4 is a schematic diagram of a policy based routing ICN based home network in accordance with a disclosed embodiment.

FIG. 4 is a schematic diagram of a policy based routing ICN based home network 400 in accordance with a disclosed embodiment. The network 400 may implement any of the naming schemes 100, 200 described above. The network 400 may comprise a home network 450 and a public network 460. The home network 450 may comprise a home gateway (HGw) 402 and a plurality of internal routers (IR) 410, 412, 414, 416. The home network 450 may also comprise a plurality of consumer nodes 420, 421, 430, 440, 441, 442 and a plurality of producer nodes 423, 432, 444, 445 coupled to the IRs 410, 412, 414, 416. The public network 460 may comprise a provider gateway (PGw) 404, an Internet Service Provider (ISP) domain 406, and a third party provider domain 408. The third party provider domain 408 may be configured to provide services and/or content to the home network 450. The ISP 406 may be configured to provide access to content and services on the Internet to the home network 450. The public network 460 may also comprise consumer nodes 422, 431, 443 of the services and/or content provided by the home network 450. The ISP 406 and the third party provider domain 408 may comprise a plurality of routers, switches, servers, and nodes configured to communicate with each other and to receive, transmit, and or forward data packets and/or configured to produce and/or provide content and/or services to the home network 450. The components of network 400 may be arranged as shown in FIG. 4.

The producer nodes 423, 432, 444, 445 may be nodes, devices, or components configured to deliver content to and receive content requests from the consumer nodes 420, 421, 422, 430, 431, 440, 441, 442, 443. For instance, the producer nodes 423, 432, 444, 445 may be fixed or mobile user-oriented devices, such as desktop computers, notebook computers, personal digital assistants (PDAs), gaming consoles, media servers, or cellular telephones. Alternatively, the producer nodes 423, 432, 444, 445 may be connectivity devices at customer premises, such as modems or set-top boxes. Similarly, the consumer nodes 420, 421, 422, 430, 431, 440, 441, 442, 443 may be fixed or mobile user-oriented devices, such as desktop computers, notebook computers, personal digital assistants (PDAs), or cellular telephones. Some nodes may be both a producer node and a consumer node with their role depending on how they are used. A nodes role may change from producer node to consumer node and vice versa.

The PGw 404, the HGw 402, and the IRs 410, 412, 414, 416 may be any nodes, devices, or components that support transportation of traffic, e.g., frames and/or packets, through the network 400, hence transparent to the ICN network, which may be the case if the ICN transport is overlaid over any other L2 or L3 network. The PGw 404, the HGw 402, and the IRs 410, 412, 414, 416 may pass the traffic onto or receive the traffic from other nodes in the network 400. For example, the network nodes—402, 404, 410, 412, 414, 416 may be routers, switches, or bridges, such as backbone core bridges (BCBs), provider core bridges (PCBs), or label switch routers (LSRs). The PGw 404, the HGw 402, and the IRs 410, 412, 414, 416 may comprise an ICN component that may allow the nodes to forward interests and content based on content name prefixes. The ICN component may be configured to route, cache, and/or store content. The IRs 410, 412, 414, 416 may be coupled to the producer nodes 423, 432, 444, 445 and the consumer nodes 420, 421, 430, 440, 441, 442, e.g., via a plurality of access networks, wired links, or wireless links. The ICN component in the IRs 410, 412, 414, 416 and the HGw 402 may be configured to apply content and/or service policies to interest (I) packets and content (C) packets, even when the content is cached within the IRs 410, 412, 414, 416 or the HGw 402. An interest packet may be a packet requesting service or content where the packet may comprise a name of the service or content requested by the consumer. A data packet may be a packet comprising content, or service related data that is returned to a consumer in reply to the interest packet. Examples of policies may include access control, service accessibility, etc. One objective here may be to enforce policy driven communication, which in this case is that the virtual group of nodes comprising the producer nodes 423, 432, 444, 445 and the consumer nodes 420, 421, 430, 440, 441, 442 may transact information in a closed group manner. For example, producer node 444 may securely transact information with producer nodes 445 and 446 and with consumer nodes 440, 441, 442, and 443. However, producer node 444 may be prevented from transacting information with consumer nodes 420, 421, and 422 because, for example, such transaction may violate one or more policies enforced by the IRs 410, 412, 414, 416 and/or the HGw 402. The nodes that may transact information with each other based on policies may comprise a group. Some producer nodes 423, 432, 444, 445 and the consumer nodes 420, 421, 430, 440, 441, 442 may belong to more than one group.

Based on the naming strategy discussed in more detail below, the network 400 may enable policy based reachability to the services provided by producer nodes 423, 432, 444, 445, and 446 inside and outside the home premises, and may allow authorized consumers at consumer nodes 420, 421, 422, 430, 431, 440, 441, 442, 443 to access the services and/or content provided by the producer nodes 423, 432, 444, 445, and 446. The traffic egressing to and ingressing from the Internet via PGw 404 may be monitored by the HGw 402. The IRs 410, 412, 414, 416 may be simplified routers as compared to the HGw 402. The IRs 410, 412, 414, 416 may support basic service and policy routing functionality. The IRs 410, 412, 414, 416 may not only act as the service gateway to devices, such as entertainment devices and temperature control devices, but may also act as a proxy to devices such as sensors that may be limited by memory and/or computing capability. The devices, such as nodes 420, 421, 423, 430, 432, 440, 441, 442, 444, 445, 446 may tether or connect to the IRs 410, 412, 414, 416 through its wireless interface(s), such as WiFi, Zigbee, or Z-Wave. The producer nodes 423, 432, 444, 445, 446 may publish services in the home network 450, which is discovered by consumer nodes 420, 421, 422, 430, 431, 440, 441, 442, 443. Once the service is learned by the network, one objective may be to enforce policy routing so that only valid interests are forwarded to service producing nodes 423, 432, 444, 445, 446. The consumer nodes 420, 421, 422, 430, 431, 440, 441, 442, 443 may be within or outside in the home network or domain 450. The HGw 402 may be connected to the PGw 404, which may be the first hop gateway for the services in the home premises enabled for outside access, or whenever a service producing device (e.g., nodes 422, 431, 443) is in a roaming mode outside the home.

Considering this setup, an objective of policy based routing may be as follows. The policy objectives enforced by the IRs 410, 412, 414, 416 and HGw 402 may allow service publishing requests to be announced throughout the home network 450 so that the IRs 410, 412, 414, 416 and the HGw 402 may learn about the services provided by the devices 423, 432, 444, 445, 446 in the home network 450. The services may be associated with service definitions which may define services available to a user. The service definitions may include name components scope, service, device, content, and service APIs described in FIG. 1 above or name components global, services, devices, content-class, access, and service-API described in FIG. 2 above. Further it could also include service description to suggest how routing information for the service can be processed. For example, for the same service announced by multiple devices, the service description may allow aggregation, while others may want to treat each instance as a separate entry. Aggregation must be carefully handled particularly if the policies may not be similar across the aggregatable advertised services. In an embodiment, the name components may include the service-ID, device-ID, content-service-type, virtual-group (name/ID), access-list, and service related metadata that includes the service API and security policies suggesting supply of credentials required to access the service. Further, the service may also be restricted based on its location and physical local space. The policies may allow consumer nodes 420, 421, 422, 430, 431, 440, 441, 442, 443 to discover these services with a substantially minimum overhead and may allow the consumer nodes 420, 421, 422, 430, 431, 440, 441, 442, 443 to express interests for these services. The home network 450 may filter the interests which do not comply with the service policy in terms of accessibility, service attributes, and/or security credentials.

The policies may allow service publishing to extend beyond the home network 450 if required. In this case, the service may be reachable from outside with the same level of security that may be required by the service owner as when the service is accessed from within the home network 450. The policies may allow mobility of devices with appropriate service resolution when accessed through the Internet irrespective of whether the device is a producer or a consumer. Additionally, the policy based routing framework may allow a home operator, a service provider, and/or third parties to enable new services with substantially minimal service configuration.

Figure 5:
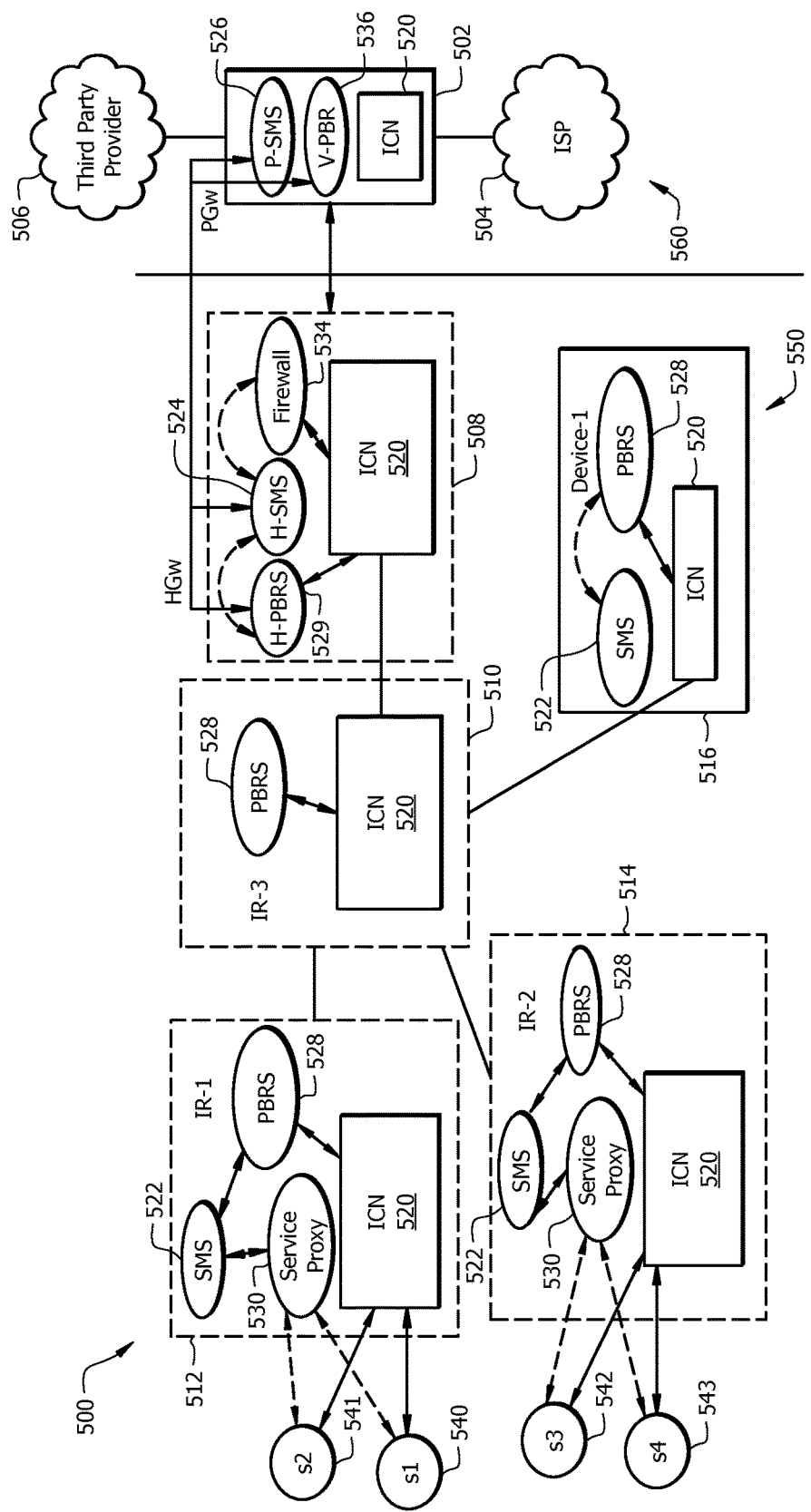
FIG. 5 is a schematic diagram of a policy based routing ICN based network in accordance with a disclosed embodiment.

FIG. 5 is a schematic diagram of a policy based routing ICN based network 500 in accordance with a disclosed embodiment. The network 500 may implement the naming schemes 100, 200, 300 described above. The network 500 may be substantially similar to network 400. Network 500 may comprise a home network 550 (or home domain) and a public network 560 (or public domain). The home network 550 may be substantially similar to home network 450. The public network 560 may be substantially similar to the public network 460. The components of network 500 may be arranged as shown in FIG. 5.

The home network 550 may comprise an HGw 508, a plurality of IRs 510, 512, and 514, and a device 516. The public network 560 may comprise a PGw 502, an ISP 504, and a third party provider 506. Each of the PGw 502, the HGw 508, the IRs 510, 512, 514, and the device 516 may comprise an ICN component 520. The IR-1 512, IR-2 514, and device 516 each may comprise a service management system (SMS) component 522. The HGw 508 may comprise a home SMS (H-SMS) 524. The HGw 508, the IRs 510, 512, and 514, and the device 516 may comprise a policy based routing system (PBRS) component 528 with a subset of functionality. The IR-1 512 and the IR-2 514 may comprise a service proxy 530. The HGw 508 may comprise a firewall 534. The HGw 508 may be substantially similar to the HGw 404 and the IRs 510, 512, and 514 may be substantially similar to the IRs 410, 412, 414, and 416.

The public network 560 may comprise a PGw 502, an ISP 504, and a third party provider 506. The PGw 502 may comprise a public SMS (P-SMS) 526, a virtual PBRS (V-PBRS) 536, and an ICN component 520. The PGw 502 may be substantially similar to PGw 404, the third party provider domain 506 may be substantially similar to the third party provider domain 408, and the ISP 504 may be substantially similar to the ISP 406.

The home network 550 may comprise two types of end devices 516, 540, 541, 542, and 543. One type of end device (e.g. device-1 516) may comprise sufficient computing capacity to manage its own services. The other type of end device (e.g. end devices s1 540, s2 541, s3 542, s4 543) may be resource constrained. For such devices 540, 541, 542, 544, a service proxy 530 in the access ICN routers 512, 514 may assist in managing the services. Service management may include naming services, publishing, managing subscription, policy enforcement, and service deletion functions. For devices (e.g., device-1 516) which have sufficient computing and memory resources, the service management may be part of the node's 516 control function. The HGw 508 may be a managed device by the ISP 504. In addition to the H-SMS 524, the HGw 508 may be equipped with a firewall function 534 to inspect traffic that is ingressing and egressing the HGw 508. In addition to subjecting the interest traffic to policies dictated by the service, the firewalling function 534 may be configurable at any level of the service based naming hierarchy. The HGw 508 may be connected to the PGw 502. The PGw 502 may be the service exit point to the Internet. The network 500 may also comprise a control plane between the HGw 508 and the PGw 502 to enable provisioning, control and management of the HGw 508. These interactions may relate to enabling or restricting service reachability outside the home network 550. Based on the user interests, the control plane may provide a means for the ISP 504 to interact with third party providers 506 to enable new services, (e.g., a health care provider may enable health monitoring systems at home by appropriate provisioning of the HGw 508 to allow the devices 516, 540, 541, 542, and 543 inside the home to report to the systems in the third party premises). Similar interaction may be possible if the device 516, 540, 541, 542, or 543 or the user is roaming outside the home premises (i.e., outside of the home network 550).

The SMS 522 may be a control module and may be instantiated in an end device capable of managing its own service (e.g., device-1 516), and may be an integral part of the IRs 510, 512, and 514. The H-SMS 524 may be substantially similar to SMS 522 and may be an integral part of the HG2 508. The service management tasks performed by the SMS 522 and/or the H-SMS 524 may include publishing (defining services), modifying, or revoking a particular service. In the IRs 512 and 514 and/or the HGw 508, a proxy 530 (the service proxy in the HGw 508 is not shown) may assist devices 540, 541, 542, and 543 in managing the services on their behalf. This proxy service may be performed with pre-knowledge of what types of devices are tethered to these devices 540, 541, 542, and 543 and the types of services being offered. Such information may be provisioned at the HGw 508 and advertised to the IRs 510, 512, and 514.

The H-SMS 524 and the P-SMS 526 may be differentiated from the SMS modules 522 because of the characteristics of the HGw 508 and the PGw 502 which may be capable of several cross-functional tasks. In the case of the HGw 508 H-SMS module 524, the H-SMS 524 may interact with the P-SMS 526 in the PGw 502 or with the firewall 534 in the HGw 508. The P-SMS module 526 may provide information to the HGw 508 to publish the PGw's 502 own services, particularly for global accessibility. The P-SMS 526 may also manage services in the provider domain (i.e., public network 560). These may be the ISP's 504 own services or services provided by the third party provider 506. The P-SMS module 526 may also take part in the discovery process when there is query for service discovery from the home network 550.

The PBRS 528 may be a light weight protocol (e.g., a distance vector protocol), whose function may be to synchronize the services and their policies in all the ICN routing devices 508, 510, 512, and 514 in the home network 550. Unlike traditional routing protocols, one purpose of the PRBS 528 may be to synchronize service definitions across the routers 508, 510, 512, and 514 in the home domain 550. This functionality may be part of a well-known routing protocol or may be separated because of its requirement to handle service definitions, which may require correlation with what has been announced in order to take appropriate action. In addition, the PRBS 528 may also manage the forwarding information base (FIB) in terms of managing the service definitions to enable policy based interest processing. These FIB entries may be logically separated so that only interests of a particular type are matched against it. The extended FIB table is discussed in greater detail below. Due to HGw's 508 ability to interact with a provider, the PBRS instance in the HGw 508 is identified as H-PBRS 529. Further the PBRS 528 on the internal routers 510. 512, 514, 516 may be differentiated from the PBRS 528 on the terminals themselves, if required.

The firewall 534 may be an information centric firewall. The firewall 534 may primarily monitor the interests that are ingressing and egressing the home boundary. When the H-PBRS 529 in the HGw 508 receives a new service advertisement, the service definition may be committed to the firewall 534 depending on if the service is allowed to be accessed from outside the home network 550 or if there is potential for this service to be roaming outside the home network 550.

The V-PBRS 536 may store the service routing policies for a particular home managed by the PGw 502. One purpose of the V-PBRS 536 may be to isolate the privacy sensitive service definitions and policy from different home domains managed by an access gateway (e.g., PGw 502). The V-PBRS 536 may interact with the H-PBRS 529 to receive advertisements of services from the home domain 550 that may require Internet access. Additionally, the V-PBRS 536 may push advertisements for services which it manages, possibly with third party provider 506 interactions, into the home domain 550. The V-PBRS 536 may interact with other controllers in the network 500 to connect a service request from the Internet or from the home domain 550 to another entity producing the service. In this case, the services from V-PBRS 536 itself may contain access policies that may be committed in the FIB, at the HGw 508 and other internal routers 510, 512, 514, 516.

The steps to enable policy based routing and forwarding may be as follows. The process may be a bootstrapping process (e.g., a process to initially configure the device so that it may be provisioned) and may involve the HGw 508 discovering the P-SMS 526 of the PGw 502, the HGw 508 submitting its own device details, and being provisioned via interaction with the PGw 502. The provisioning interactions may include registration and the HGw 508 obtaining service definitions that may be required to instantiate in-home services, which may include the naming structure and service instantiation based on user requirements. Further, the P-SMS 526 may also provision services that are available through third party provider 506. The provisioning interactions may also configure the firewall rules so as to avoid any security breaches into the home network 550. Further, the provisioning interactions may also configure the PBRS 528 and the V-PBRS 536 in order to enable exchange of service definitions between the home network 550 and the ISP domain 504. Additionally, the disclosed system 500 supports arbitrary composition of atomic home services through a management interface. Thus, new services may be composed through a management interface and provided to the HGw 508. The HGw may house the new features and may meaningfully combine the policies of the new service with the existing policies of the home domain. The HGw 508 may commit the new service across the network 500 through interaction of the H-PBRS 529, the V-PBRS 536, and the PBRSs 528 on the internal routers 510, 512, 514, 516.

The SMS 522 in the end device 516 or the proxy service management function 530 in the ICN routers 512, 514 may manage the service(s) offered by the device 516, 540, 541, 542, or 543. The service, S, may contain several attributes (e.g., {Service Name, Content Type, Access List, Action flag, Security Attributes}). The service name may be the name used to express an interest for the service; the content type may be the type of content, such as video, music etc. The access list may be the groups or individuals who are allowed to access the service. The action-flags may be well-known flags used in the interest, which may enable the forwarding nodes to enforce a certain policy. The security attributes may be interpreted as security credentials that may be required to be submitted by the consuming node when it subscribes to or requests service consumption.

When a device 516, 540, 541, 542, or 543 bootstraps, the device 516, 540, 541, 542, or 543 may conduct neighbor and service discovery to be associated with an IR 510, 512, 514 at the service level. During the association, the device 516, 540, 541, 542, or 543 may receive service related reachability and naming information in order to publish its own service into the network 500. Once the SMS 522 in the device 516 is ready to announce the service, the SMS 522 may publish an interest to the peer SMS 522 in the IRs 510, 512, 514. The service publishing information may carry naming and policy information defined previously. Once the SMS 522 in the IRs 510, 512, 514 receives the service publishing request, the SMS 522 in the IRs 510, 512, 514 may announces the service to the PBRS 528. The service definition may be published locally to the policy routing module if there is one, or a proxy (e.g., service proxy 530) may announce the service on behalf of end devices (e.g., S1 540). While publishing, the service attributes may be translated to a meaningful encoding by the routing protocol to allow the current and receiving routers to convert the policies into actions in the forwarding plane. If the service policy requires only local access within the IRs 510, 512, 514, then this service is not announced by the SMS 522 to PBRS 528. To limit the physical space where the service is announced, the announcement may also be associated with a number-of-hop field, which may limit the hops to which the advertisement is announced.

The routing protocol may serve the purpose of synchronizing these service definitions across the home network 550. For each rule advertised by its neighbor, the routing protocol may modify its local policy FIB by adding, modifying, or deleting the existing rules. If the service publishing is conducted on a periodic basis, then only the difference in the current announcement and the last announcement may be announced. The existing rules may be deleted by explicit deletion, which may be more efficient, but which may add a little control overhead.

Alternatively service publish and discovery can also be conducted using strategies disclosed in U.S. patent application Ser. No. 13/658,299 filed Oct. 23, 2012 by Xinwen Zhang, et al. and entitled, "Name-Based Neighbor Discovery and Multi-Hop Service Discovery in Information-Centric Networks," which is incorporated herein by reference as if reproduced in its entirety.

After appropriate processing of the received service advertisements, IRs 510, 512, 514 may put the service advertisements through a filtering and aggregation process in order to commit it to the FIB. The default ICN FIB may comprise the prefix names that may direct incoming interests to potential directions from which the content may be found. The service specific FIB entries may be differentiated from the default entries using logical marking or by managing different tables. With policy based routing, the prefixes may be services with policy based actions.

An example of a policy based FIB 600 according to a disclosed embodiment is shown in FIG. 6. The FIB 600 may comprise a service name field 602, a groups/users field 604, an action-flag field 606, a policy functions field 608, and a next hop field 610 for two service entries 612, 614. The entry 612 may correspond to a service with service name 602 of "/entertainment/media-center/video", with groups/users 604 of "private" and "AliceFriends", each having its own action-flag 606 associated with a different policy function 608. The entry 614 may correspond to a service with a service name 602 of "/climate/thermo-stat-1/". Corresponding to each service entry 612, 614 is the access list comprising groups/users 604 or individuals allowed to access the service. Further corresponding to each groups/users 604 is/are action flag(s) 606 that informs the router of the kind of policy enforcement the interest should be subjected to in order for the interest to be forwarded to the next hop (e.g., one of the action flags may indicate that some shared-key pre-established between the producers and consumers should be checked) whenever the consumer expresses interest for the service. The incoming interests may be forwarded to the next hop only if the interest meets the requirements dictated by the action flag 606.

The entry 612 (e.g., /entertainment/media-center/video) may comprise a root (or a portion of a root) for a name. Similarly, the entry 614 (e.g., /climate/thermo-stat1/) may comprise a root (or a portion of a root) for a name.

Returning to FIG. 5, in order to optimize router processing and avoid more computational checks at the service producing device (e.g., S1 540 or device-1 516), the first hop router (e.g., IR-3 528) may flag the interests which have already passed the Action-flag check, so that the interest may be forwarded without further processing in the subsequent hops. Typically it may be the first hop router that screens interests actively. If the IR (e.g., IR-3 510) does not have enough computing capability, the interests may be forced through the HGw 508, where the policies may be enforced. With this mode of validation, the service producing node (e.g., S1 540) may need to check for unmarked interests.

Once the interests reach the service producer (e.g., S1 540), the corresponding content may be generated. If the content is cached in the local or intermediate router (e.g., IR 512 or 510), the interest may be responded to with cached content after passing through the policy checks. In the case where the proxy 530 in the IRs 512, 514 serves the interests on behalf of end devices 540, 541, 542, 543, the proxy 530 may respond with the current information or generate a new interest to the device 540, 541, 542, 543 for the device 540, 542, 542, 543 to respond to with the latest data, depending on the staleness (e.g., how recently the content has been cached) of the current information.

At the HGw 508, these service definitions may also be compared against the HGw 508 firewall 534. In particular, the service definitions may be compared against the incoming/outgoing filtering rules. The firewall rules may be applied for the egressing and ingressing transiting traffic, but may not be applied in some embodiments for intra-home traffic. The HGw 508 may further forward the advertisement to the PGw 502 if the service definition requires global access.

Once the V-PRBS 536 receives the service advertisement, the V-PRBS 536 may initiate other service interactions, such as with the authentication, authorization and accounting (AAA) server in order to charge the user whenever the service is accessed outside the home domain.

To access a service from the Internet, an application may use the globally routable service name, which may be forwarded within a domain or across multiple domains to the home domains' 550 ISP' s 504 home service hosting site, from where it may be resolved to a PGw 502 locator.

For a service from the home network 550 destined to a third party provider 506, the routing may forward the interest towards the HGw 508, where the interest may be subjected to firewall policies, and then forwarded to the PGw 502. The PGw 502 may then forward the interest to another service point for location resolution to the third party site 506.

The interaction between the PBRS 528 and the V-PBRS 536 may also provide a way for the provider to handle service requests from the home domain 550, as appropriate contextual based virtual FIB provisioning may help to handle service requests based on attributes, such as customer service level. The interaction between the PBRS 528 and the V-PBRS 536 may also allow features, such as late-binding where location resolution may happen dynamically. For example, video on demand (VoD) requests from the customer premises from home domain 550 may be handled in order to resolve to different locators. Service differentiation based on the application type may also be conducted.

The action flag 606 and security policies 608 may also be applied if the content is cacheable. In this case, the interest, action-flag and policy action may also be applied against the content store (CS) and the pending interest table (PIT).

The usage of the action flags 606 may also be extended to content as a result of a successful interest transit to the service producer. In this case, the content may be subjected to other transformation(s) before being sent to the requesting consumer.

Service protocol discovery, as described in U.S. patent application Ser. No. 13/658,299 filed Oct. 23, 2012 by X. Zhang, et al. and entitled "Name-Based neighbor Discovery and Multi-Hop Service Discovery in Information-Centric Networks," which is incorporated herein by reference as if reproduced in its entirety, may be integrated with the disclosed policy based routing. When a service is published in the local service publishing and discovery (SPD) module, the SPD may update the routing protocol with its locally published service definitions, which may be synchronized across all the routers 510, 512, 514 to enable the policies in the forwarding plane.

Figure 7:
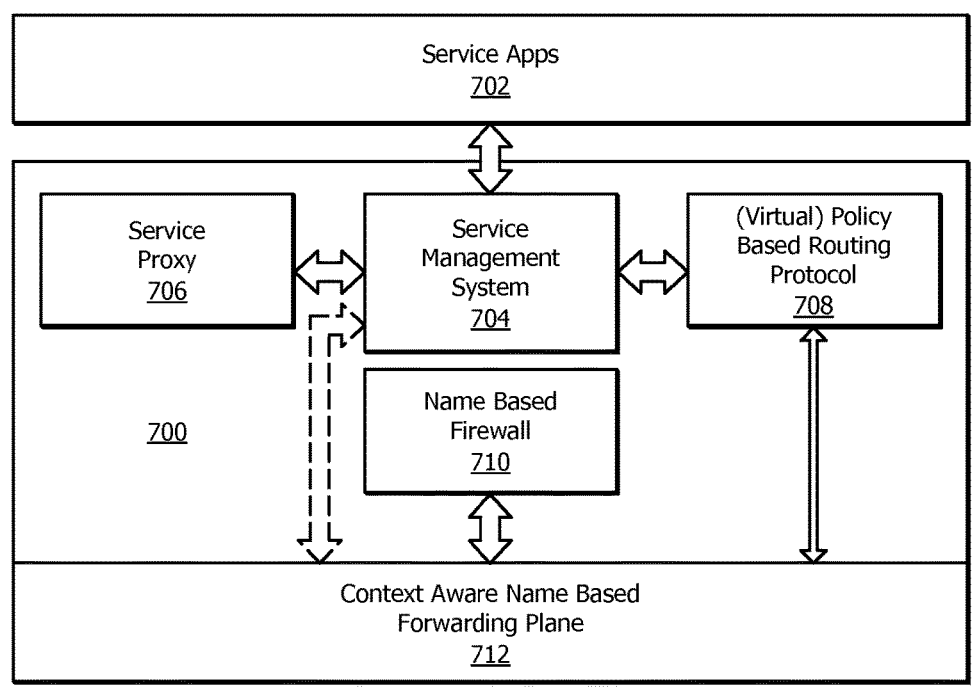
FIG. 7 is a schematic diagram of an ICN router in accordance with a disclosed embodiment.

FIG. 7 is a schematic diagram of an ICN router 700 in accordance with a disclosed embodiment. The ICN router 700 may be implemented as any of the IRs 410, 412, 414, 416 in FIG. 4 or the IRs 510, 512, 514 in FIG. 5. The ICN router 700 may also be implemented as the HGw 402 or the PGw 404 in FIG. 4 or as the HGw 508 or the PGw 502 in FIG. 5. The ICN router 700 may comprise a service proxy 706, an SMS 704, a PBRS 708, and a context aware name based forwarding plane 712. The SMS 704 may communicate with one or more service applications 702 that may be executed by an external device. The service applications 702 may be service producing or service consuming applications. The SMS 704 may manage the database of local and remote services. The SMS 704 may learn of services from the PBRS 708. The SMS 704 may initially discover the HGw (e.g., HGw 508) to acquire the naming semantics for the services. The PBRS 708 may be a policy based routing protocol to synchronize service definitions across the home environment (e.g., home network 450, 550). The PBRS 708 may commit FIB entries with policy flags and actions. In the HGw (e.g., HGw 402 or 508), the PRBS 708 may interact with the service provider's V-PBRS (e.g., V-PBRS 236) to export/import services. The name based firewall 710 may be part of the home gateway (e.g., HGw 508) and may ensure that only valid interests may cross the home domain to the Internet and vice-versa. Service profiles may be committed to the forwarding plane 712. Action that may be required by the service may be applied on the incoming interest at each hop by the forwarding plane 712. The service proxy 706 may act as a proxy to constrained devices, such as a wireless sensor network (WSN) or an Internet of Things (IoT), that lack sufficient processing and/or storage to implement the disclosed policy based routing. The service proxy 706 may act as a data sink and a service and management point for such devices.

Figure 8:
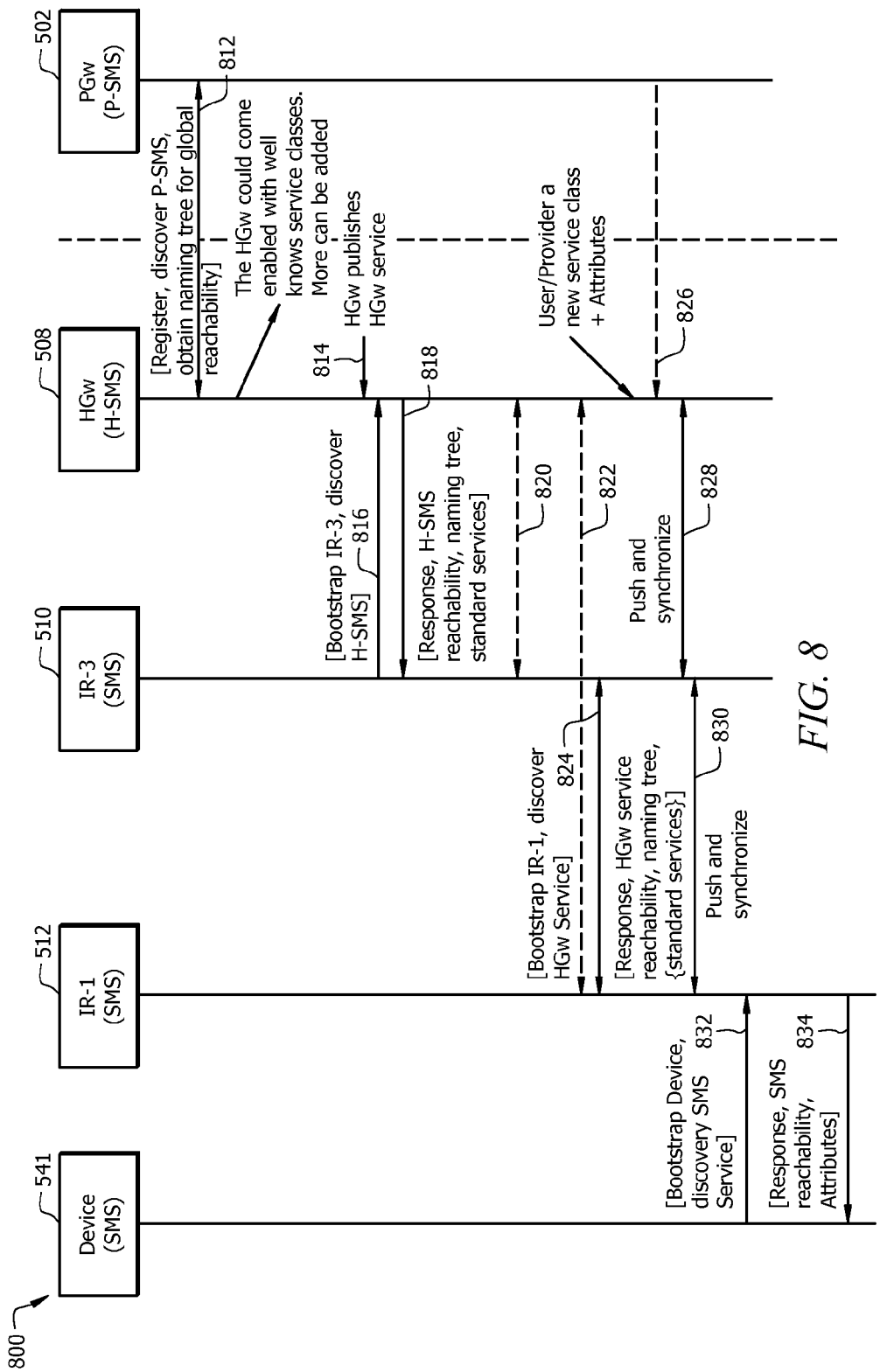
FIG. 8 is a protocol diagram of a bootstrapping and provisioning method for a policy based routing ICN based home network according to a disclosed embodiment.

FIG. 8 illustrates an embodiment of a bootstrapping and provisioning method 800 that may be implemented in the policy based routing ICN based home network 500. The diagram in FIG. 8 may illustrate how an HGw is bootstrapped and provisioned by the ISP. Further, the HGw may announce its own service, which may be discovered by the IRs and may provision itself. Additionally, the end devices may tether to one of the IRs to configure and publish its own service.

The method 800 may comprise a plurality of messages exchanged between the devices 502, 508, 510, 512, and 541 in network 500. The method may begin at step 812, where the HGw 508 and the PGw 502 may exchange messages to register the HG2 508 with the PGw 502 and for the HGw 508 to discover the P-SMS 526. At step 812, the HGw 508 may also obtain the naming tree for global reachability. The HGw 508 may become enabled with well know service classes and more can be added over time. At step 814, the HGw 508 may publish the HGw 508 services. At step 816, the IR-3 510 may bootstrap and discover the H-SMS 524. At step 818, the HGw 508 may respond to the IR-3 510 with the H-SMS reachability, the naming tree, and the services provided by the HGw 508. At step 820, the IR-3 510 and the HGw 508 may continue to exchange messages. At step 822, the IR-1 may bootstrap to discover the HGw 508 services. At step 824, the HGw 508 may respond with the HGw 508 service reachability information, the naming tree, and standard services provided by the HGw 508. At step 826, the PGw 502 may push a new service class and attributes to the HGw 508. At step 828, the HGw 508 may push the mew service class and attributes to the IR-3 510 and the IR-3 510 and HGw 508 may synchronize. At step 830, the IR-3 510 may push the new service class and attributes to the IR-1 512 and the IR-1 512 and IR-3 510 may synchronize. At step 832, the device 541 may bootstrap the device 541 and may discover the SMS service on the IR-1 512. At step 834, the IR-1 512 may respond with the SMS reachability and attributes, after which the method 800 may end.

Figure 9:
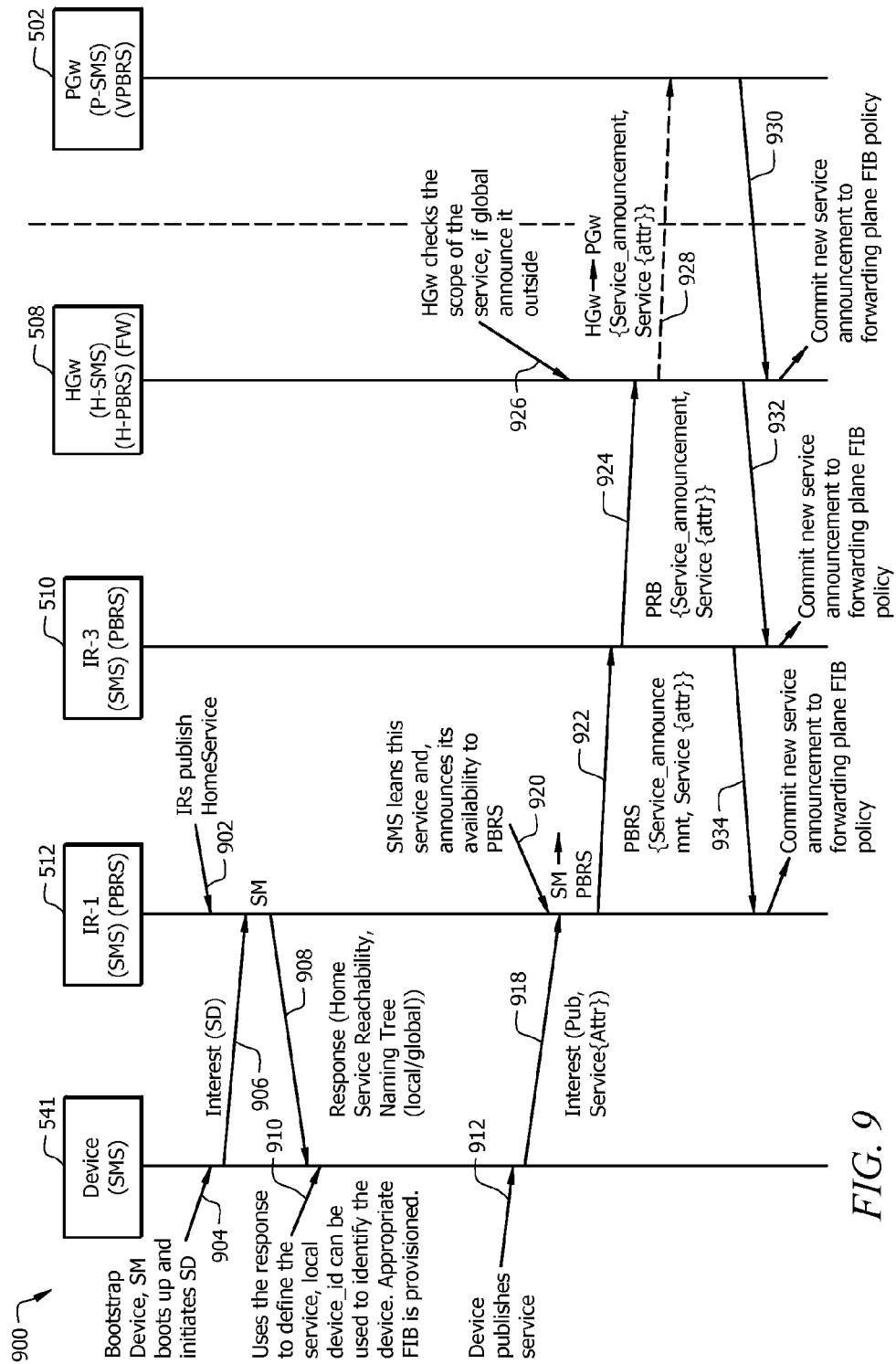
FIG. 9 is a protocol diagram of a service publishing method for a policy based routing ICN based home network according to a disclosed embodiment.

FIG. 9 illustrates an embodiment of a service publishing method 900 that may be implemented in the policy based routing ICN based home network 500. The diagram shown in FIG. 9 shows the steps that may be involved in obtaining information to define a service by an end device and to publish the service to the first hop IR SMS. The SMS in the first hop IR may then announce the service to the PBRS, which may announce the service throughout the home network and outside the home network, if required. Further, if the service provided by the end device requires reachability outside the home, the PBRS in the HGw may announce the service to the V-PBRS in the PGw.

The method 900 may begin at step 902 where the IR-1 512 may publish the home service. At step 904, the device 541 may be bootstrapped, the SMS in the device 541 may be booted up, and the SMS in the device e541 may initiate service discovery. At step 906, the device 541 may transmit a service discovery interest to the IR-1 512. At step 908, the IR-1 512 may respond to the device 541 with the home service reachability and with the local and global naming tree. At step 910, the device 541 may use the response to define the service. Also, in step 910, the local device_id may be used to identify the device 541. The appropriate FIB may also be provisioned in step 910. At step 912, the device 541 may publish a service provided by the device 541. At step 918, the device 541 may transmit an interest containing the service publication and the service attributes to the IR-1 512. At step 920, the SMS 522 in the IR-1 512 may learn the service provided by device 541 and may announce the availability of the service provided by the device 541 to the PBRS 528 in the IR-1 512. At step 922, the PBRS 528 in the IR-1 512 may transmit a service announcement with the service attributes to the IR-3 510. At step 924, the PBRS 528 in the IR-3 50 may transmit a service announcement with the service attributes to the HGw 508. At step 926, the HGw 508 may check the scope of the service and, if the service is global, the HG2 508 may, at step 928, announce the service with the service attributes to the PGw 502. At step 930, the HGw 508 may commit the new service announcement to the forwarding plane FIB policy. At step 932, the IR-3 510 may commit the new service announcement to the forwarding plane FIB policy. At step 934, the IR-1 512 may commit the new service announcement to the forwarding plane FIB policy, after which, the method 900 may end.

Figure 10:
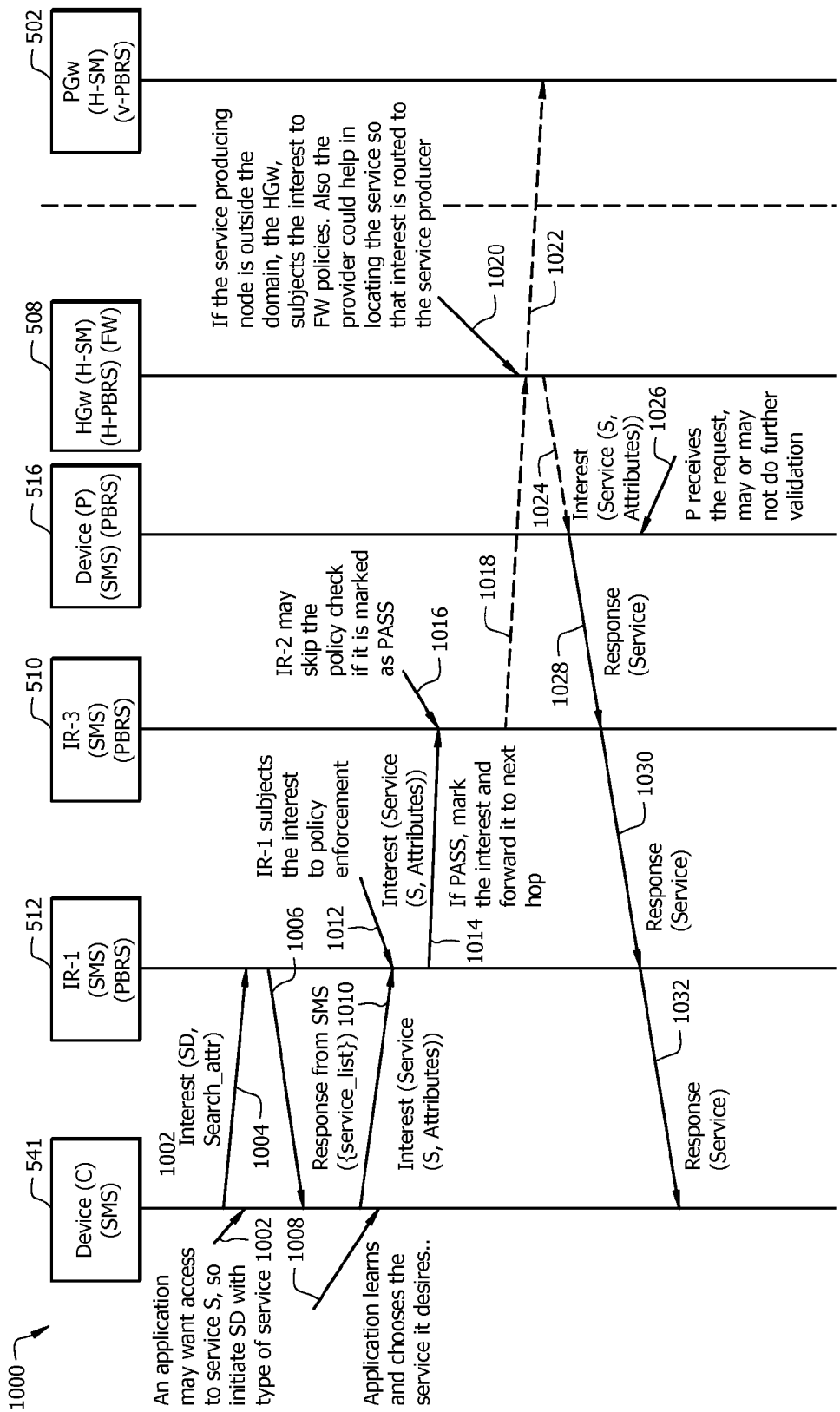
FIG. 10 is a protocol diagram of a service discovery method for a policy based routing ICN based home network according to a disclosed embodiment.

FIG. 10 illustrates an embodiment of a service discovery method 1000 that may be implemented in the policy based routing ICN based home network 500. The diagram in FIG. 10 illustrates how an end device may discover a service by querying the SMS in the IR. Once the request is responded to, the application may express an interest to the IR, which may then forward the interest subjecting the interest to policies configured in the transport plane.

The method 1000 may begin at step 1002, where an application on device (C) 541 may desire access to a service "S" and may initiate a service discovery indicating the type of service "S" desired. At step 1004, the device (C) 541 may transmit a service discovery interest with the search attributes of the service "S" desired to the IR-1 512. At step 1006, the IR-1 512 may transmit a response from the SMS 522 in the IR-1 512 to the device 541, where the response provides a service list to the device (C) 541. At step 1008, the device (C) 541 may learn the services from the service list and may select a service. At step 1010, the device (C) 541 may transmit an interest to the IR-1 512, where the interest may comprise a name that indicates that the device 541 desires a service and wherein the interest indicates the identity of the service "S" and the service's attributes. The name in the interest may be constructed according to the naming tree provided by the HGw, where the naming tree may comprise a naming scheme 100 or 200. At step 1012, the IR-1 512 may subject the interest to policy enforcement based on the name in the interest. At step 1014, if the interest passes the policy enforcement, the IR-1 512 may mark the interest as "PASS" to indicate that the interest has passed policy enforcement and may forward the interest to the next hop (e.g., IR-3 510). At step 1016, the IR-3 may p the policy check if the interest is marked as "PASS." At step 1018, the IR-3 510 may forward the interest to the HGw 508. At step 1020, the HGw 508 may determine if the service producing node is outside the home domain 550. At step 1022, if the service producing node is outside the home domain, the HGw 508 may subject the interest to forwarding policies and forward the interest to the PGw 502. The provider, PGw 502, may help in locating the service so that the interest is routed to the service producer. At step 1024, the HGw 508 may determine that the service producing node id device (P) 516 and may forward the interest with the service and attributes to the device (P) 516. At step 1026, the device (P) 516 may receive the interest request and may perform further validation. In an embodiment, the device (P) 516 may not perform further validation on the interest. At step 1028, the device (P) 516 may transmit a response service to IR-3 510. At step 1030, the IR-3 may forward the response service to the IR-1 512. At step 1032, the IR-3 512 may forward the response service to the device (C) 541, after which, the method 1000 may end.

Although described primarily with reference to a home network, the disclosed policy based routing may be implemented in any ICN based network. For example, the disclosed policy based routing may also be extended to the enterprise scenario in which similar requirements may exist, as in limiting information exchange among certain groups of spatially spread users in different domains, or even within a single domain. Even in this case, the naming ontology, shown in FIGS. 1 and 2, may be constructed for a given enterprise based on the enterprise's own requirements. In such scenarios, the PGw may be an enterprise gateway (EGw) configured to enforce enterprise policies. These service names may be associated with policies, which may be encoded and exchanged between edge routers within the domains, or within the domain. These routing policies may be enforced as FIB policies, which may be used to actively process the incoming interests to ensure only valid interests are allowed to be forwarded to the next hop or across the domain boundaries. This may enable applications to publish services and to subscribe to services irrespective of mobility at either the user-level, the device-level, or the service-level.

Figure 11:
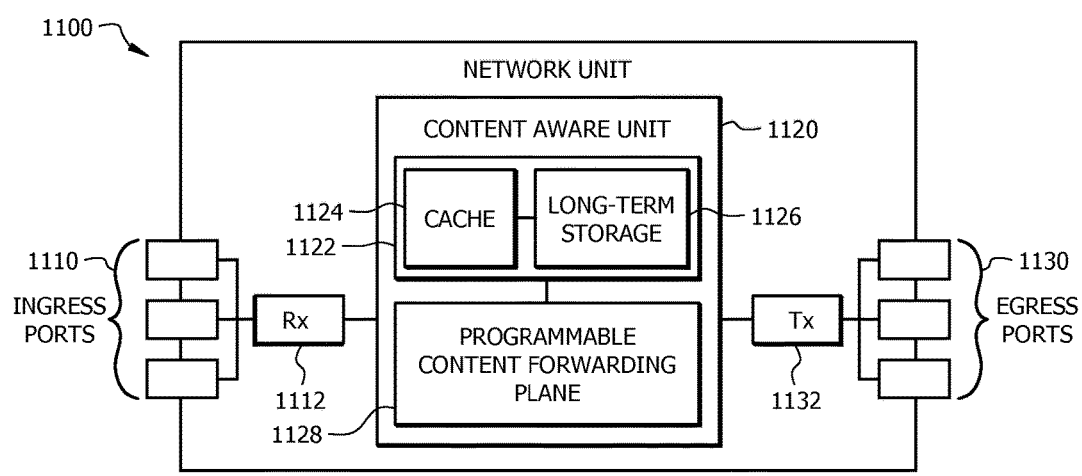
FIG. 11 illustrates an embodiment of a network node, which may be any device that transports and processes data through a network.

FIG. 11 illustrates an embodiment of a network node 1100, which may be any device that transports and processes data through a network. For instance, the network node 1100 may be a content router or any node or router in the NDN schemes described above. The network node 1100 may be configured to implement or support the adaptive forwarding strategies described above. The network node 1100 may comprise one or more ingress ports or faces 1110 coupled to a receiver (Rx) 1112 for receiving signals and frames/data from other network components. The network node 1100 may comprise a content aware unit 1120 to determine which network components to send content to. The content aware unit 1120 may be implemented using hardware, software, or both. The content aware unit 1120 may be a general purpose processor, an application specific integrated circuit (ASIC), or a digital signal processor (DSP). The network unit 1100 may also comprise one or more egress ports or faces 1130 coupled to a transmitter (Tx) 1132 for transmitting signals and frames/data to the other network components. The receiver 1112, content aware unit 1120, and transmitter 1132 may also be configured to implement at least some of the disclosed methods, which may be based on hardware, software, or both. The components of the network node 1100 may be arranged as shown in FIG. 11.

The content aware unit 1120 may also comprise a programmable content forwarding plane block 1128 and one or more storage blocks 1122 that may be coupled to the programmable content forwarding plane block 1128. The programmable content forwarding plane block 1128 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 1120 or the network unit 1100. The programmable content forwarding plane block 1128 may interpret user requests for content and accordingly fetch content, e.g., based on metadata and/or content name, from the network or other content routers and may store the content, e.g., temporarily, in the storage blocks 1122. The programmable content forwarding plane block 1128 may then forward the cached content to the user. The programmable content forwarding plane block 1128 may be implemented using software, hardware, or both and may operate above the IP layer or layer 2 (L2) in the OSI model. The storage blocks 1122 may comprise a cache 1124 for temporarily storing content, such as content that is requested by a subscriber. Additionally, the storage blocks 1122 may comprise a long-term storage 1126 for storing content relatively longer, such as content submitted by a publisher. For instance, the cache 1124 and the long-term storage 1126 may include Dynamic random-access memories (DRAMs), solid-state drives (SSDs), hard disks, or combinations thereof.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim1s incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node configured to operate in a network, comprising:
  a receiver configured to receive a request for a service, wherein the request comprises a hierarchically structured service name comprising a root portion and a suffix portion, wherein the root portion identifies a first set of components and the suffix portion identifies a remaining set of components such that the components available are represented in the request, wherein the first set of components have a higher level than the remaining set of components, and wherein the root portion and the suffix portion are configured to contain a different combination of the components for the service name in a different context to permit selective application of a policy to at least one of the root portion and the suffix portion;
  a data storage component comprising a network synchronized policy rule synchronized with other nodes in the network using name-based routing;
  a processor coupled to the receiver and to the data storage component, wherein the processor is configured to:
    apply the network synchronized policy rule to the request when the root portion matches an associated service name root portion associated with the network synchronized policy rule;
    determine, based on the hierarchically structured service name, a next hop in the network toward a second network node within the network providing the service when the request meets the synchronized policy rule; and
    synchronize service definitions and service policies with the other nodes in the network based on a name of the service; and
  a transmitter coupled to the processor and configured to forward the request to the next hop when instructed by the processor,
  wherein the network node comprises a home gateway (HGw) configured to permit a user to assign a name to one or more of the components and a name to one or more of the services provided by the components during a device activation phase.

2. The network node of claim 1, wherein the hierarchically structured service name comprises a first level identifying a reachability scope of the service, a second level identifying the name of the service, a third level identifying a type of device to distinguish between heterogeneous devices, a fourth level identifying a type of content, and a fifth level providing service primitives, wherein the root portion comprises at least the first level and the suffix portion comprises at least the fifth level.

3. The network node of claim 1, wherein the hierarchically structured service name corresponds to a plurality of different contextual properties, wherein the different contextual properties comprise at least one of a first level indicating whether the service is globally reachable or locally reachable, a second level identifying the name of the service, a third level identifying a device type, a fourth level identifying a content class, a fifth level identifying access privileges, and a sixth level indicating a service application programming interface (API) attribute.

4. The network node of claim 1, wherein the data storage component comprises a forwarding information base (FIB) comprising a plurality of entries, and wherein each entry comprises a hierarchical service name field, a user accessibility field, an action flag field, a policy field, and a next hop field.

5. The network node of claim 4, wherein the processor is further configured to instruct the transmitter to forward the request only when the request meets a policy requirement in the policy field indicated by the action flag field.

6. The network node of claim 1, wherein the processor is further configured to refrain from applying the network synchronized policy rule when the request comprises a pass flag indicating that a packet passed policy requirements applied in another network node.

7. The network node of claim 1 further comprising a policy based routing service (PBRS) configured to commit forwarding information based (FIB) entries with a policy flag and an action.

8. The network node of claim 7 further comprising a service management system configured to manage a database of local and remote services and learn services from the PBRS.

9. The network node of claim 7, wherein the network node comprises an internet service provider (ISP) managed provider gateway and the PBRS comprises a virtual PBRS (V-PBRS), wherein the V-PBRS is configured to interact with a home PBRS (H-PBRS) to connect a service request from the Internet to a home domain service in a home domain or to connect a service request from the home domain to an Internet service.

10. The network node of claim 1, wherein the network node comprises an enterprise gateway configured to enforce enterprise policies based on a hierarchical naming convention.

11. The network node of claim 1 further comprising a name based firewall that is configured to ensure that only valid interests pass from a home domain to the Internet and ensure that only valid interests pass from the Internet to the home domain.

12. The network node of claim 11, wherein the name based firewall is configurable at any level of the hierarchically structured service name.

13. The network node of claim 9, wherein the network node comprises the H-PBRS, and wherein the HGw is configured to receive a new service composed on a management interface, combine the policies of the new service with existing policies, and expose the new service through interaction of the H-PBRS with the V-PBRS in a provider gateway and with the PBRS in an internal network node.

14. The network node of claim 1 further comprising a service proxy that is configured to act as a service management system (SMS) for devices that lack sufficient resources to implement the SMS.

15. A method in an information centric networking (ICN) network node for discovering a service, comprising:
  synchronizing, at a processor, service definitions and service policy rules with other nodes in the ICN, wherein synchronizing comprises applying name-based networking principles, and wherein the service policy rules are synchronized with the other nodes in the network using name-based routing;
  receiving, at a receiver, a service interest for a service from a network device, wherein the service interest comprises a hierarchically structured service name comprising a root portion and a suffix portion, wherein the root portion identifies a first set of components and the suffix portion identifies a remaining set of components such that the components available are represented in the service interest, wherein the first set of components have a higher level than the remaining set of components, and wherein the root portion and the suffix portion are configured to contain a different combination of the components for the service name in a different context to permit selective application of a policy to at least one of the root portion and the suffix portion;
  applying, with the processor, an ICN synchronized policy rule associated with a service root portion to the service interest based on the root portion matching the service root portion;
  determining, with the processor, a next network node toward a network node providing the service based on the hierarchically structured service name when the processor determines that the service interest passes the ICN synchronized policy rule; and
  instructing at the processor a transmitter to forward the interest to the next network node when the processor determines that the service interest passes the ICN synchronized policy rule
  wherein the network node comprises a home gateway (HGw) configured to permit a user to assign a name to one or more of the components and a name to one or more of the services provided by the components during a device activation phase.

16. The method of claim 15 further comprising marking the service interest to indicate that the service interest passed the policy before forwarding the service interest, wherein marking the service interest indicates to the next network node to refrain from applying the policy.

17. The method of claim 15, further comprising:
  determining with the processor whether a service producing node for the service resides outside a home domain; and
  instructing with the processor the transmitter to forward the service interest to a provider gateway when the service resides outside the home domain.

18. The method of claim 15, further comprising:
  determining an identity of a service requester, wherein the policy applied is determined at least in part based on the identity of the service requester, wherein a first service requester identity corresponds to a first policy and a second service requester identity corresponds to a second policy.

19. The method of claim 15, wherein the network device is an ICN router, wherein the service interest is marked to indicate that the policy has been applied to the service interest, and wherein the method further comprises refraining from applying the policy to the service interest.

20. In an information centric networking (ICN) network node in an ICN based network, a computer program product executable by a processor, the computer program product comprising computer executable instructions stored on a non-transitory computer readable medium that when executed by the processor cause the ICN network node to perform the following:
  synchronize service definitions and service policy rules with other nodes in the ICN, wherein synchronizing comprises applying name-based networking principles, and wherein the service policy rules are synchronized with the other nodes in the network using name-based routing;
  receive a service interest from a network device for a service, wherein the service interest comprises a hierarchically structured service name comprising a root portion and a suffix portion, wherein the root portion identifies a first set of components and the suffix portion identifies a remaining set of components such that the components available are represented in the service interest, wherein the first set of components have a higher level than the remaining set of components, and wherein the root portion and the suffix portion are configured to contain a different combination of the components for the service name in a different context to permit selective application of a policy to at least one of the root portion and the suffix portion;

apply an ICN synchronized policy rule associated with a service root portion to the service interest based on the root portion matching the service root portion;

determine a next network node toward a network node providing the service based on the hierarchically structured service name when the processor determines that the service interest passes the ICN synchronized policy rule; and instruct a transmitter to forward the service interest to the next network node when the processor determines that the service interest passes the ICN synchronized policy rule wherein the ICN network node comprises a home gateway (HGw) configured to permit a user to assign a name to one or more of the components and a name to one or more of the services provided by the components during a device activation phase.

* * * * *